Nov. 4, 1930.  J. RUFFING, SR  1,780,505
OIL GAUGE ROD WIPER
Filed Feb. 20, 1930
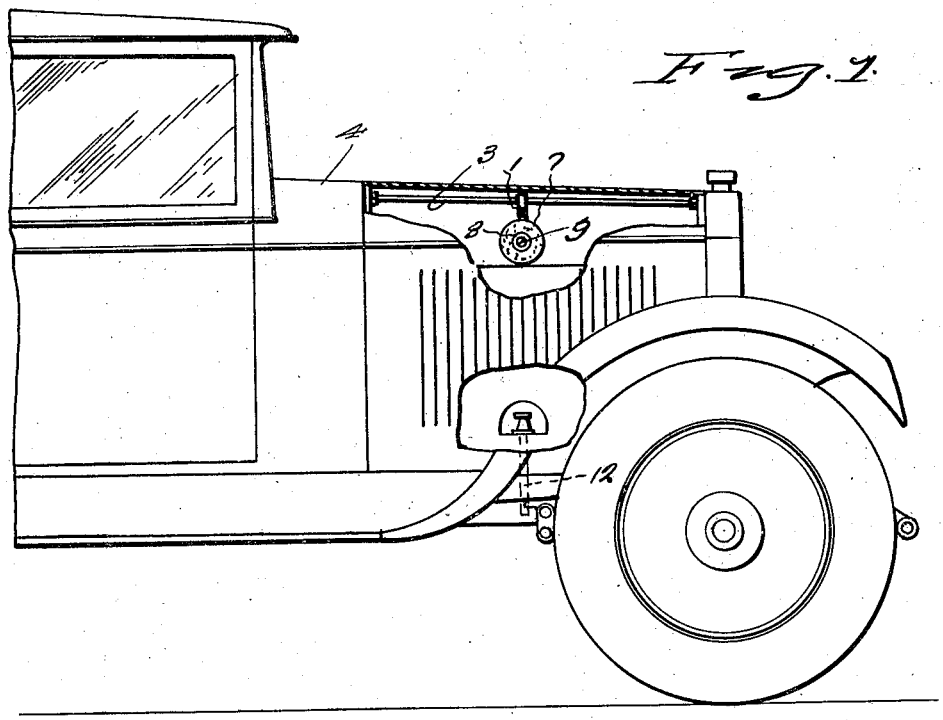
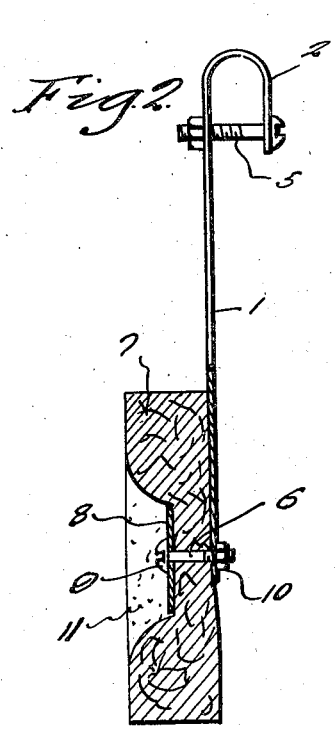
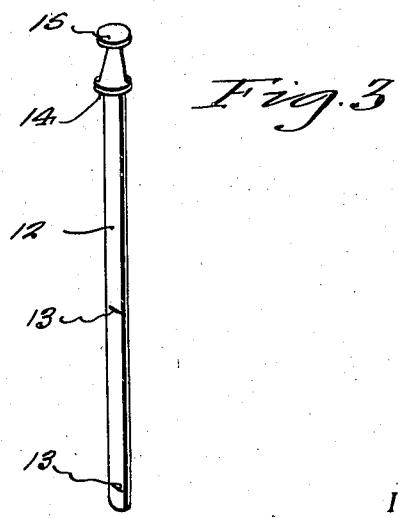
Inventor
John Ruffing, Sr.
By Clarence A. O'Brien
Attorney Patented Nov. 4, 1930

1,780,505

UNITED STATES PATENT OFFICE

JOHN RUFFING, SR., OF NOKOMIS, ILLINOIS

OIL-GAUGE-ROD WIPER

Application filed February 20, 1930. Serial No. 429,990.

This invention relates to new and useful improvements in oil gauge rod wipers and has for its primary object to provide, in a manner as hereinafter set forth, a wiper of this character which is adapted to be expeditiously and securely mounted beneath the hood of an automobile at a point to conveniently permit the oil gauge rod of the engine to be drawn thereacross to remove the oil therefrom in order that quantity of oil in the crank case of the engine may be accurately determined.

Another important object of the invention is to provide an oil gauge rod wiper of the character set forth which embodies means whereby the same may be mounted in position beneath the hood of the automobile without the necessity of altering or removing and replacing any of the parts of said automobile.

Other objects of the invention are to provide an oil gauge rod wiper of the character described which will be simple in construction, strong, durable, efficient in its use and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:—

Figure 1 is a view showing the forward end of an automobile in side elevation and partly broken away to illustrate the wiper constructed in accordance with this invention mounted in position thereon and showing the location of same with respect to the oil gauge rod.

Figure 2 is a view principally in section of the device detached from the automobile.

Figure 3 is a perspective view showing an oil gauge rod of the conventional type.

Referring to the drawings in detail, the reference character 1 designates an elongated, flat metallic hanger provided at its upper end with a substantially inverted U-shaped portion forming a yoke 2 adapted to engage over the radiator brace rod 3 of the automobile 4. A securing bolt 5 extends through the yoke 2 below the radiator brace rod 3 for clamping the hanger 1 rigidly thereon.

The lower end portion of the hanger 1 is perforated to receive a threaded bolt 6 which extends centrally through a felt disc 7. A flat metallic washer 8 is mounted on the bolt 6 in abutting engagement with the flat head 9 of said bolt and serves to compress the central portion of the felt disc 7 when the bolt is secured on the hanger 1 through the medium of the nut 10. By this arrangement the central portion of the disc 7 which constitutes the supporting portion thereof is maintained under compression and materially strengthened and a depression 11 is formed in the wiping face of the disc, as clearly seen in Figure 2 of the drawing. It will further be seen that the marginal portion of the disc which constitutes the wiping portion thereof is comparatively loose and pliable.

The reference numeral 12 indicates an oil gauge rod of conventional construction having the indicating bar 13 spaced longitudinally thereof, a head 14 on its upper end and a gripping knob 15 spaced from the head.

It will be seen that the hanger 1 may be expeditiously mounted at any desired point on the radiator brace rod 3 of the automobile and when so mounted the same will be very conveniently located to facilitate wiping the rod thereacross when the same is withdrawn from the crank case. When the rod is drawn across the outer face of the felt disc 7 the soft loose marginal portion of said disc efficiently removes the oil therefrom and the periphery of the depression 11 therein serves to further expedite the removal of said oil. As before stated, the compressed central portion of the disc materially strengthens the same against tearing and prolongs the period of usefulness thereof. The disc 7 may be expeditiously removed and replaced on the hanger 1 when it is so desired for any reason by simply detaching the bolt 6 from the lower end of said hanger 1.

It is believed that the many advantages of an oil gauge rod wiper constructed in accordance with this invention will be readily understood, and although the preferred embodiment of the invention is as illustrated and described, it is to be understood that changes in the details of construction may be had which will fall within the scope of the invention as claimed.

What is claimed is:—

An oil gauge rod wiper of the character described comprising a flat, elongated metallic hanger, an integral supporting yoke on one end of the hanger, a clamping bolt extending through the yoke, a wiping disc of compressible material disposed against the other end portion of the hanger, a headed bolt extending centrally through the disc and through the hanger, a washer mounted on the bolt and interposed between the disc and the bolt head, and a nut threaded on the bolt and engaged with the hanger in a manner to draw the bolt therethrough for compressing the central portion of the disc and forming a depression in the free side of the disc, the marginal portion of the disc being uncompressed and comparatively loose.

In testimony whereof I affix my signature.

JOHN RUFFING, Sr.